United States Patent
Fang et al.

(10) Patent No.: US 9,747,648 B2
(45) Date of Patent: *Aug. 29, 2017

(54) SYSTEMS AND METHODS FOR PUBLISHING DATA ON SOCIAL MEDIA WEBSITES

(71) Applicants: Kuo-Chun Fang, Inglewood, CA (US); Grace Fang, Inglewood, CA (US)

(72) Inventors: Kuo-Chun Fang, Inglewood, CA (US); Grace Fang, Inglewood, CA (US)

(*) Notice: Subject to any disclaimer, the term of this patent is extended or adjusted under 35 U.S.C. 154(b) by 269 days.

This patent is subject to a terminal disclaimer.

(21) Appl. No.: 14/721,001

(22) Filed: May 26, 2015

(65) Prior Publication Data

US 2016/0212075 A1    Jul. 21, 2016

Related U.S. Application Data

(60) Provisional application No. 62/105,314, filed on Jan. 20, 2015, provisional application No. 62/111,223, filed on Feb. 3, 2015.

(51) Int. Cl.
| | |
|---|---|
| G06Q 50/00 | (2012.01) |
| G06F 17/30 | (2006.01) |
| G06K 9/46 | (2006.01) |
| H04L 12/58 | (2006.01) |
| H04N 5/232 | (2006.01) |
| G06K 9/00 | (2006.01) |
| G06K 9/18 | (2006.01) |

(52) U.S. Cl.
CPC ....... *G06Q 50/01* (2013.01); *G06F 17/30424* (2013.01); *G06K 9/00677* (2013.01); *G06K 9/46* (2013.01); *H04L 51/08* (2013.01); *H04L 51/32* (2013.01); *H04N 5/23229* (2013.01); *G06K 9/18* (2013.01)

(58) Field of Classification Search
None
See application file for complete search history.

(56) References Cited

U.S. PATENT DOCUMENTS

| | | | |
|---|---|---|---|
| 2012/0058782 A1* | 3/2012 | Li | G01S 19/14 455/456.2 |
| 2013/0046773 A1* | 2/2013 | Kannan | G11B 27/105 707/754 |
| 2016/0210704 A1* | 7/2016 | Fang | G06Q 50/01 |

* cited by examiner

*Primary Examiner* — Kenny Lin

(57) ABSTRACT

Methods and systems for publishing data on social media website(s). A system may include an identifier processing device for determining a device identifier (ID) of a computing device publishing a social media website. The device ID uniquely identifies the computing device in a network. The identifier processing device may also be configured to extract data from the determined device identifier of the computing device. The system may also include a tagging device for associating the extracted data with a user-generated data and a generated data. The system may further include a data publishing device for publishing the extracted data along with the user-generated data on the social media website on the computing device.

20 Claims, 9 Drawing Sheets

600

| SSID | 802.11 | # | 🔒 | 📶 |
|---|---|---|---|---|
| #Bacon | a | 1 | 🔒 | |
| #CEO2013 | n | 1 | 🔒 | |
| @AmazonCart | a | 1 | 🔒 | |
| @Home | ? | 153 | 🔒 | |
| @Market | ? | 11 | 🔒 | |
| @Market_NG | ? | 11 | 🔒 | |
| BRONCO_EXT | ? | 11 | 🔒 | |
| Last Day To Buy Google Glass | ? | 1 | 🔒 | |
| lin | ? | 6 | 🔒 | |
| linksys | ? | 1 | 🔒 | |
| MyCharterWiFia7-2G | ? | 11 | 🔒 | |
| MyCharterWiFia7-5G | ? | 153 | 🔒 | |
| RoyFang@M-Commerce.com | ? | 1 | 🔒 | |

FIG. 6

SYSTEMS AND METHODS FOR PUBLISHING DATA ON SOCIAL MEDIA WEBSITES

CROSS REFERENCE OF RELATED APPLICATION

This application claims priority to U.S. provisional application No. 62/105,314 titled "Method and System for posting updates in social media with text data extracted from SSIDs or Device IDs broadcasted by a Wireless Access Device in its coverage area" and provisional application No. U.S. 62/111,223.

FIELD OF THE INVENTION

The present invention generally relates to techniques for publishing data in a network through various social media websites. Particularly, the present subject matter relates to systems and methods for tagging data, such as images, social media postings, etc., with unique identifier(s), and publishing the data along with the unique identifier(s) on various social media websites in a network.

BACKGROUND OF THE INVENTION

With an ever-increasing data and information on the Internet, finding relevant information has become a daunting task. To add to this, the enthusiasm of people to capture every moment of their lives and upload the same on social media networks has made this web of information even more tangled and complex. Constant updating of status, images, locations, activities etc. provides the millions of social media users an opportunity to showcase the social and other aspect of their lives. Amidst this social networking frenzy, a trend that has caught the fancy of users is that of tagging their pictures, data, location and other information to ensure that their data becomes a part of a specific theme based pool of information that can be easily showcased or retrieved at a later time by using the specific tags. One such common tagging mechanism is adding 'Hashtags' to any data uploaded on social media.

A hashtag may be a metadata tag or label added to any data posted on social media networks to ensure that users searching for information related to a specific theme or field easily find the data. For example, the hashtag "#YummyItalian" added to a picture of friends at an Italian restaurant showcases visit to an Italian restaurant and the friends' view that the food at the restaurant is great! All that a user needs in order to promptly upload data on social media platforms is a user device such as a smart phone, tablet etc. and a wireless access device such as a wireless router that enables the user device to wirelessly connect to the Internet. Widespread usage of wireless access devices at public and commercial places has become a boon for social networking users to constantly post and tag data on social networking platforms.

Though a great way to sort and access data posted on social media, hashtags and other tagging mechanisms have also resulted in a lot of wrong and redundant categorization of social media data. This is because either user do not know the correct manner of tagging social media data posted by them or lot of non-uniform and random tags are used. For example, for photographs of two different groups of friends dining at the same restaurant, one photograph is tagged "#YummyItalian" while the other is tagged "#AwesomeFood". Now a user looking for good Italian food online will be able to access the first photograph but not the second due to usage of an overly generic tag. Moreover, in both the instances, the restaurant owner does not benefit in any way as the restaurant is not identified in any of the tags and the owner has to rely on the users' discretion of disclosing the location of dining or the name of the restaurant.

SUMMARY

In today's world where sorting the pool of information and data available on social media has become essential for enabling meaningful access and utilization of such data, techniques are needed that helps the users to appropriately tag the social media data being uploaded. Also, there is a great need of a method that helps the businesses take advantage of this tagging done by social network users.

The present disclosure provides systems and methods for improved techniques for publishing data through various social media websites by using a computing device. The present disclosure also provides methods and systems for tagging data with unique identifiers and publishing the data and the associated unique identifiers or tags through social media website by using the computing device, which overcomes the above-referenced limitations and others.

The present disclosure finds particular application in publishing data on various websites, such as social media websites, based on device identifiers of the computing devices in a network, and will be described with particular reference thereto. However, it is to be appreciated that the present disclosure is also amenable to other like applications.

The present invention is directed to methods, systems and computer program products for publishing data on social media websites using a first computing device, wherein the data posted on a social media website is attached with a unique data derived from a device identifier broadcasted by a second computing device.

In one implementation, methods, systems, and computer program products are provided for posting or publishing data on a social media website using a computing device such as, a first computing device. The method provides detecting a second computing device having an associated device identifier. The second computing device broadcasts these device identifiers to computing device(s) in the vicinity. Data may be extracted from the broadcasted device identifiers and is then attached to a user-generated data. Thereafter, the device identifier and the user-generated data is posted or published on social media website(s).

In one implementation, a computer program product including program instructions tangibly stored on a computer-readable medium and operable to cause a computer system to perform a method is provided. The computer program product stores the instruction for capturing the device identifier, by a first computing device, broadcasted by a second computing device. The CPP also includes instructions for extracting data from the device identifier and attach the extracted data to a user-generated data before posting it on social media.

In other implementations, the computing device used can be any device which can perform calculations and can be used for generating and/or uploading user generating data for posting on social media. The computing device without any limitation includes devices like phones, tablets, computers, mobile devices, and laptops. In other implementations, the extracted data of the device identifier can either be in the form of formatted text, unformatted text or can include alphabets, numbers, symbols, and so forth. In one implementation, the device identifier includes a service set identifier. In one implementation, the wireless access device is a router. In other implementations, methods, systems and computer program products are also provided to allow users to select the extracted data or device identifiers as tags while posting to social media websites or to automatically attach tags while posting to social media websites. Also, methods, systems and computer program products are provided to add or attach geographical or time relevant information in form of tags to the user-generated data while posting the data on the social media website(s).

An embodiment of the present disclosure provides a system for publishing data on at least one social media website. The system may include an identifier processing device configured to determine a device identifier (ID) of a computing device publishing the at least one social media website. The device identifier may uniquely identify the computing device in a network. The identifier processing device may also be configured to extract data from the determined device identifier of the computing device. The system may also include a tagging device configured to associate the extracted data with a user-generated data. The system may also include a data publishing device configured to publish the extracted data along with the user-generated data on the at least one social media website on the computing device.

Another embodiment of the present disclosure provides a method for publishing data on at least one social media website. The method may include determining, by an identifier processing device, a device identifier (ID) of a computing device publishing the at least one social media website, wherein the device identifier uniquely identifies the computing device in a network. The method may also include extracting, by the identifier processing device, data from the determined device identifier of the computing device. The method may also include associating, by a tagging device, the extracted data a user-generated data. The method may further include publishing, by a data publishing device, the extracted data along with the user-generated data on the at least one social media website.

Yet another embodiment of the present disclosure provides a method for publishing data on at least one social media website. The method may include detecting, by a detection device, a second computing device present within a pre-defined area from the first computing device. The method may also include capturing, by an identifier processing device, a device identifier of the second computing device during broadcast of the device identifier by the second computing device, wherein the device identifier uniquely identifies the second computing device in a network. The method may also include associating, by a tagging device, the captured device identifier with a user-generated data. The method may further include posting, by a data publishing device, the user-generated data along with the device identifier on the at least one social media website.

A further embodiment of the present disclosure provides a system for posting data on at least one social media website using a first computing device. The system may include a detection device configured to detect a second computing device present within a pre-defined area from the first computing device. The system may also include an identifier processing device configured to capture a device identifier of the second computing device during broadcast of the device identifier by the second computing device. The device identifier may uniquely identify the second computing device in a network. The system may also include a tagging device configured to associate the captured device identifier with a user-generated data. The system may also include a data publishing device configured to post the user-generated data along with the device identifier on the at least one social media website.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

FIG. 6 illustrates an embodiment wherein multiple SSIDs are transmitted by a wireless access device;

DETAILED DESCRIPTION

Figure 1A:
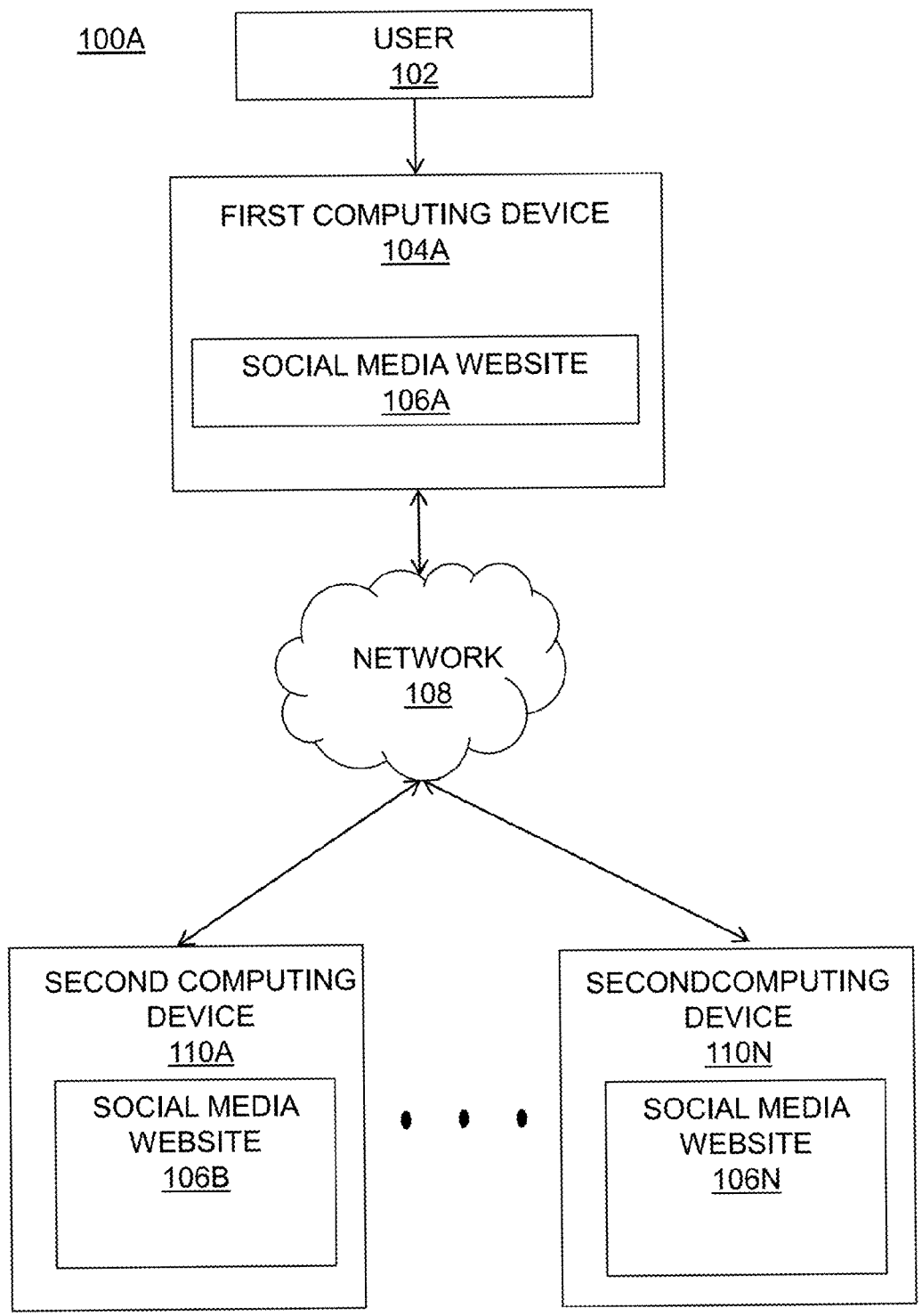
FIG. 1A is a schematic diagram illustrating an exemplary environment, where various embodiments of the present disclosure may function.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Non-Limiting Definitions:

In various embodiments of the present disclosure, definitions of one or more terms that will be used in the document are provided below.

As used herein, a "computing device" as used herein includes a single device capable of communicating, and exchanging one or messages with other devices present in a network. The computing device is also configured to connect to the network such as the Internet.

As used herein, a "Graphical User Interface" (GUI) can include an interface on the device enabling a user to interact with the device or computing device.

As used herein, a "social media website" refers websites that may allow people to create, share or exchange information, ideas, and pictures/videos in a virtual community or virtual social network.

As used herein, a "computing device" can include a single device or multiple devices, which may be configured to automatically tag data or data of various images and the data/data posted on various social media websites, and combination of any of these.

As used herein, an "identifier processing device" refers to a device including a software, hardware or combination of these, that is configured to process device identifier captured from computing devices.

Further, as used herein, a "tagging device" refers to a device including hardware, software, firmware, or combination of these, that can be configured to tag the extracted data with a user-generated data in the network.

Further, as used herein, a "data publishing device" refers to a device including hardware, software, firmware, or combination of these. Further, the data publishing device can publish data on various social media websites in the network.

Further, as used herein, a "transceiving device" is a device configured to transmit or receive data, files, and images to and from computing device in the network. The transceiving device can include hardware, software, firmware, and combination of these.

The device or system for publishing data on social media websites may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Exemplary Embodiments

FIG. 1A is a schematic diagram illustrating an exemplary environment 100, where various embodiments of the present disclosure may function. The environment 100 may primarily include a first computing device 104A, a number of second computing devices 110A-110N interconnected to each other via a network 108. Each of the first computing device 104A and the second computing devices 110A-110N may be accessed by a user, for example, the first computing device 104A may be accessed by a user 102. Examples of the first computing device 104A, and the second computing devices 110A-110N may include, but are not limited to, laptop computers, desktop computers, smart phones, tablet computers, televisions, and so forth. Further, the first computing device 104A and the second computing devices 110A-110N may exchange data or information with each other via the network 108. Further, the network 108 can be a wired network, a wireless network, and combination of these. In some embodiments, the first computing device 104A and the second computing devices can communicate with each other via wireless communication such as Near Field Communication (NFC), Bluetooth®, and Wi-Fi communication, and so forth.

Further, the first computing device 104A may be configured to publish data on a social media website 106A. The user (such as the user 102) can access at least one of a social media websites 106A-106N on their computing devices, i.e. the first computing device 104A, the second computing devices 110A-110N.

Further, the user 102 may post or upload data through the social media website 106A. Hereinafter, for the sake of better understanding the posted data or uploaded data on the social media website may be referred as a posting or data posting. In some embodiments, the postings on a number of social media websites 106A-106N can include an image, a discussion form, a textual data, a Quick Response (QR) code or the like.

In some embodiments, the first computing device 104A may be configured to detect one or more of the second computing devices 110A-110N that are present in vicinity or present within a pre-defined area for example, within 5 meters, from the first computing device of the first computing device 104A. Each of the second computing devices 110A-110N has an associated device identifier. The device identifier may uniquely identify the second computing devices 110A-110N in the network 108. Examples of the device identifier may include, a Service Set Identifier (SSID), a Universal Unique Identifier (UUID), and so forth. Each of the second computing devices 110A-110N is configured to broadcast their associated device identifier in the network 108.

The first computing device 104A may be configured to capture one of the device identifiers from the broadcasted identifiers of one or more second computing devices 110A-110N. The first computing device 104A is configured to extract data from the captured device identifier.

Further, the first computing device 104A may be configured to extract data from the device identifier, by applying one or more predefined rules. Examples of the predefined rules may include, but are not limited to, rules for recognizing and extracting social media handlers. Examples of the handlers may include, but are not limited to, "#Hashtag", "@MyHandle", "Owner@email.com", "http://domain.com/sub", "Quick Response (QR) code", and so forth. In some embodiments, the user 102 while configuring the first computing device 104A may specify the predefined rules. In some embodiments, the first computing device 104A extracts data from the device identifier by ignoring space in between the text or spelling errors on the device identifiers, postings etc.

The first computing device 104A is also configured to associate the extracted data with a user-generated data. The first computing device 104A may also be configured to publish or post the user-generated data along with the extracted data through one of the social media websites 106A-106N.

The first computing device 104A may be configured to publish the user-generated data, such as posting, along with the extracted data through at least one of the social media websites 106A-106N that are being accessed on the second computing devices 110A-110N and the first computing device 104A based on a publishing setting defined by the user 102. For example, the user 102 may define or select one or more of the social media websites 106A-106N on which the data and the identifier can be published.

Figure 1B:
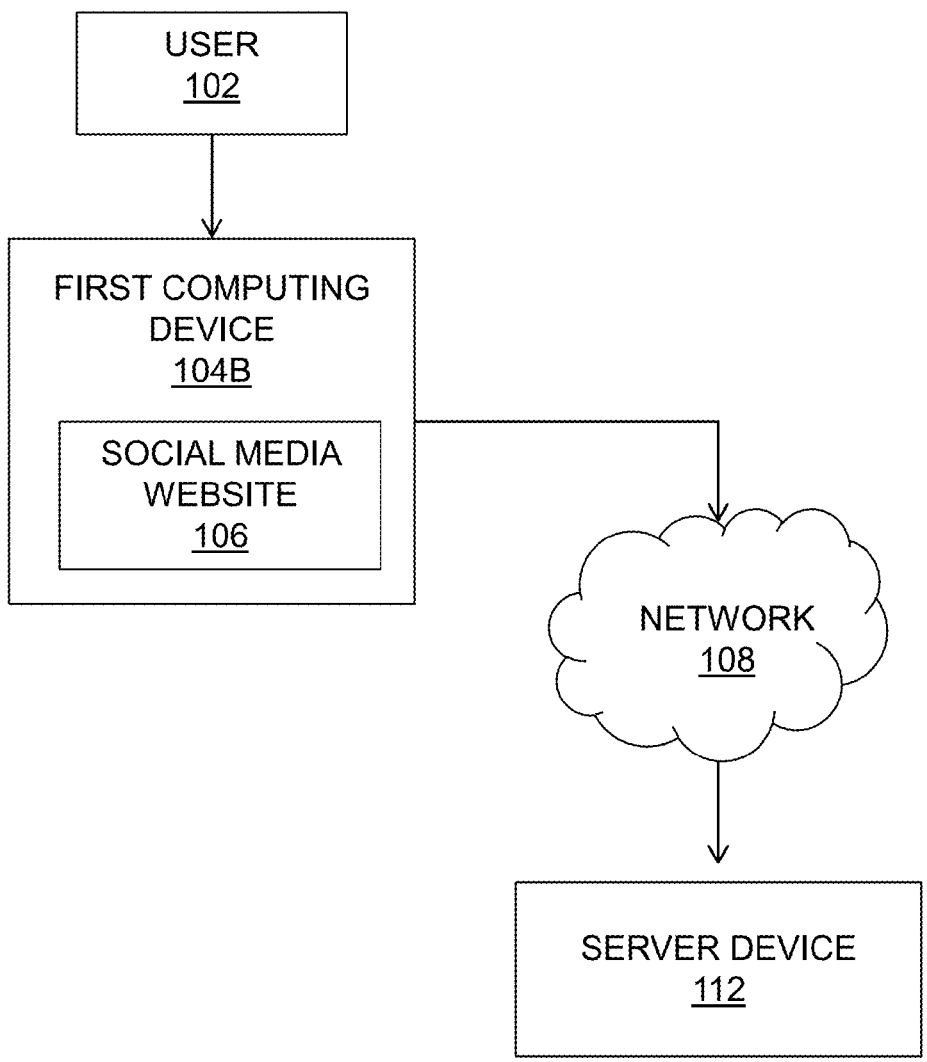
FIG. 1B is a schematic diagram illustrating another exemplary environment, where various embodiments of the present disclosure may function.

In some embodiments, the first computing device 104A may send the device identifier to a network device or another computing device in the network 108 for processing. The network device or another computing device may process the device identifier and publish the data on the network 108 through the social media websites 106A-106N. FIG. 1B is a schematic diagram illustrating another exemplary environment 100B, where various embodiments of the present disclosure may function. As shown, the environment 100B may include the user 102 having the associated computing device 104B including the social media website 106B. The environment 100B may also include a server device 112 configured to receive the device identifier of the first computing device 104B. In some embodiments, the server device 112 may detect the device identifier of the computing device 104B using wired or wireless communication. The computing device 104B can connect to the server device 112 via the network 108. The server device 112 is also configured to extract data from the device identifier and/or format the device identifier. The server device 112 may also be configured to associate the extracted data with user-generated data including such as, but not limited to, images, text, postings, and so forth. The server device 112 is also configured to send the user-generated data along with the extracted data to the first computing device 104B. The first computing device 104B may then publish the user-generated data along with the extracted data through one or more social media websites 106A-106B based on a user defined settings.

In some embodiments, the server device 112 may publish the user-generated data along with the extracted data through one or more social media websites 106A-106B based on a user defined settings.

Due to similarity in structure and functionality, the first computing device 104A-104B may be collectively referred as first computing device 104.

Figure 2:
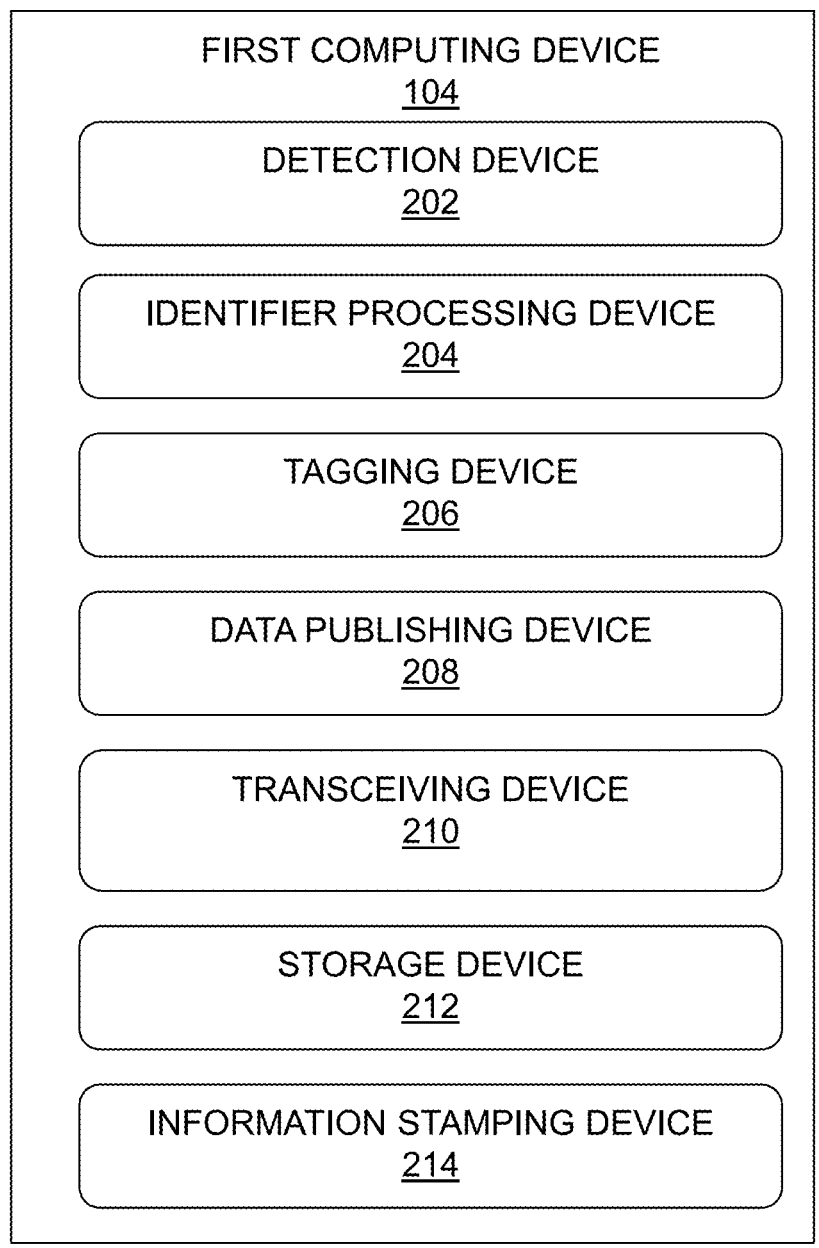
FIG. 2 is a block diagram illustrating various system elements of an exemplary computing device, in accordance with an embodiment of the present disclosure.

FIG. 2 is a block diagram 200 illustrating various system elements of the exemplary first computing device 104 if FIGS. 1A-1B, in accordance with an embodiment of the present disclosure. As shown, the first computing device 104 primarily may include a detection device 202, an identifier processing device 204, a tagging device 206, a data publishing device 208, a transceiving device 210, and a storage device 212.

As discussed with reference to FIG. 1A-1B, the first computing device 104 may be accessed by the user 102 for publishing data or content through the social media websites 106A-106N. The detection device 202 may be configured to detect other computing devices such as the second computing devices 110A-110N, present within a pre-defined distance from the first computing device 104. The identifier processing device 204 is configured to capture device identifier(s) of the second computing devices 110A-110N broadcasting the device identifiers.

The identifier processing device 204 is also configured to extract a device identifier of one or more of the second computing devices 104A-104N. The identifier processing device 204 may extract the data such as, numbers, alphabets, pictures, text, symbols, etc. from the images based on the predefined rules. The identifier processing device 204 may also be configured to apply the predefined rules for extracting the data from the device identifiers by using the OCR technique. In some embodiments, the identifier processing device 204 for extracting the data from the device identifiers uses an Optical Pattern Recognition (OPR) technique. Examples of the predefined rules for extracting text from the device identifiers may include, such as, but not limited to, a rule to extract the text with no space included in between words, a rule to extract the text that is highlighted in the image, a rule to extract the text that is not preceded with a hash tag, a rule to extract the text that is preceded with a hash tag, with no spaces included between the words, and without checking the spelling, and so forth. Further examples of the predefined rules may include, such as, but not limited to, one or more predefined rules for recognizing and extracting five types of social media handlers The five types of social media handlers may include "#Hashtag", "@MyHandle", "Owner@email.com", "http://domain.com/sub", "Quick Response (QR) code", and so forth. Further, the identifier processing device 204 may be configured to use an Optical Character Recognition (OCR) or OPR technique for extracting the data from the images. The identifier processing device 204 may also be configured to format the extracted data. The identifier processing device 204 may be further configured to format the extracted data by using the special notations.

The tagging device 206 is configured to associate the extracted or formatted data of the device identifier with a user-generated data. The user-generated data may include images, postings, text, numbers, symbols, and so forth. The tagging device 206 may also be configured to associate the extracted data with the at least one social media website 106A-106N by prefixing at least one handler to the extracted data. The data publishing device 208 is configured to publish or post the user-generated data along with the extracted data through one or more of the social media websites 106A-106N based on a publishing setting defined by the user 102. The publishing setting may include or indicate user preferences regarding the social media websites 106A-106N, regarding the first computing devices 104A-104B and the second computing devices 110A-110N, where the user 102 may want the user-generated data, tags, and extracted data to be published. The data publishing device 208 is also configured to publish the extracted data along with the user-generated data on the one or more social media websites 106A-106N being accessed on one or more computing devices within the network 108.

The first computing device 104 may also include an information stamping device 214. The information stamping device 214 is configured to attach location information, in form of geo tag, to the user-generated data based on a geographical location of the computing device 104. The geo tag will help the viewers of the content posted on social media to understand the location from where the content was posted. The information stamping device 214 may also be configured to attach time related information to the user-generated data and the device identifier while publishing through the social media websites 106A-106N based on a time setting of the first computing device 104. The time information may include the time when the user-generated data is posted on the social media website 106.

The transceiving device 210 is configured to send and receive data to and from other computing devices, such as the second computing devices 110A-110N, the server device 112, and so forth, present in the network 108. The storage device 212 may store the data such as user information, authentication information, and device identifiers of the computing devices, the postings, and so forth.

In some embodiments, the tagging device 206 may be configured to determine at least one unique identifier, such as an identifier, based on the data extracted from the device identifier. The unique identifier may include at least one keyword including text, symbols, numbers, and so forth. Further, the unique identifier may uniquely identify the data in the network 108. The tagging device 206 may also be configured to associate the time information based on a time setting of the computing device, such as the first computing device 104, with the user-generated data. Further, the tagging device 206 is also configured to attach geographical location of a computing device, for example the first computing device 10, with the user-generated data.

In some embodiments, the user 102 may manually select an identifier or tag including text, symbols, numbers, etc., based on the user-generated data. The tagging device 206 may also be configured to associate the identifier or tag with the user-generated data for uniquely identifying the user-generated data. In some embodiments, the tagging device 206 associates the unique identifier or tag with the user-generated data using the OCR or the OPR technique.

Figure 3:
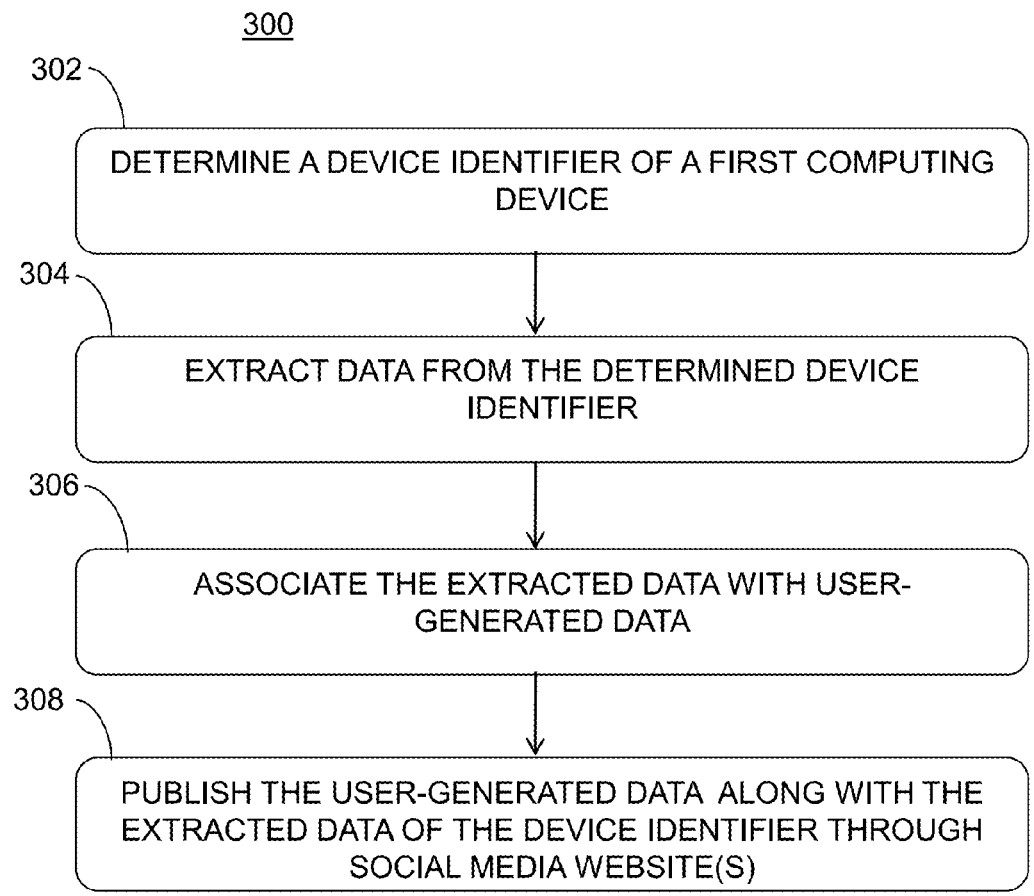
FIG. 3 is a flowchart illustrating an exemplary method for publishing data on a social media website, in accordance with an embodiment of the present disclosure.

FIG. 3 is a flowchart illustrating an exemplary method 300 for tagging of data of captured images, in accordance with an embodiment of the present disclosure. As discussed with reference to FIG. 1A, the user 102 may access the social media website 106A on the computing device 104A for publishing and/or tagging data, images, postings etc. Further, as discussed with reference to FIG. 1B, the user 102 may publish and tag the images, postings etc. through the server device 112. Further, as discussed with reference to FIG. 2, the first computing device 104 includes the detection device 202, the identifier processing device 204, the tagging device 206, the data publishing device 208, the transceiving device 210, the storage device 212, and the information stamping device 214.

At step 302, a device identifier of a first computing device, such as the first computing device 104, is identified. The device identifier may include a Service Set Identifier (SSID) and a Universal Unique Identifier (UUID), and so forth. At step 304, data is extracted from the device identifier. In some embodiments, the identifier processing device 204 captures the device identifier and extracts data from the device identifier.

At step 306, the extracted data is associated with user-generated data. The user-generated data may include images, text, numbers, symbols, postings, and so forth. In some embodiments, the tagging device 206 associates the extracted data with the user-generated data. In further embodiments, the tagging device 206 associates the extracted data with the user-generated data by prefixing at least one handler to the extracted data. Examples of the handlers may include, but are not limited to, "#Hashtag", "@MyHandle", "Owner@email.com", "http://domain.com/sub", "Quick Response (QR) code", and so forth.

At step 308, the user-generated data along with the extracted information of the device identifier are published through one or more of the social media websites 106A-106N. In some embodiments, the information such as time related, location related is also published along with the user-generated data through the social media websites 106A-106N. In some embodiments, the data publishing device 208 publishes the user-generated data, extracted data etc. through the social media websites 106A-106N. The information stamping device 214 may attach the geo-location information and the time related information on the user-generated data based on the geographical location of the computing device 104 and a timestamp based on the clock settings of the computing device 104, may be added to the user content being posted on social media.

Figure 4:
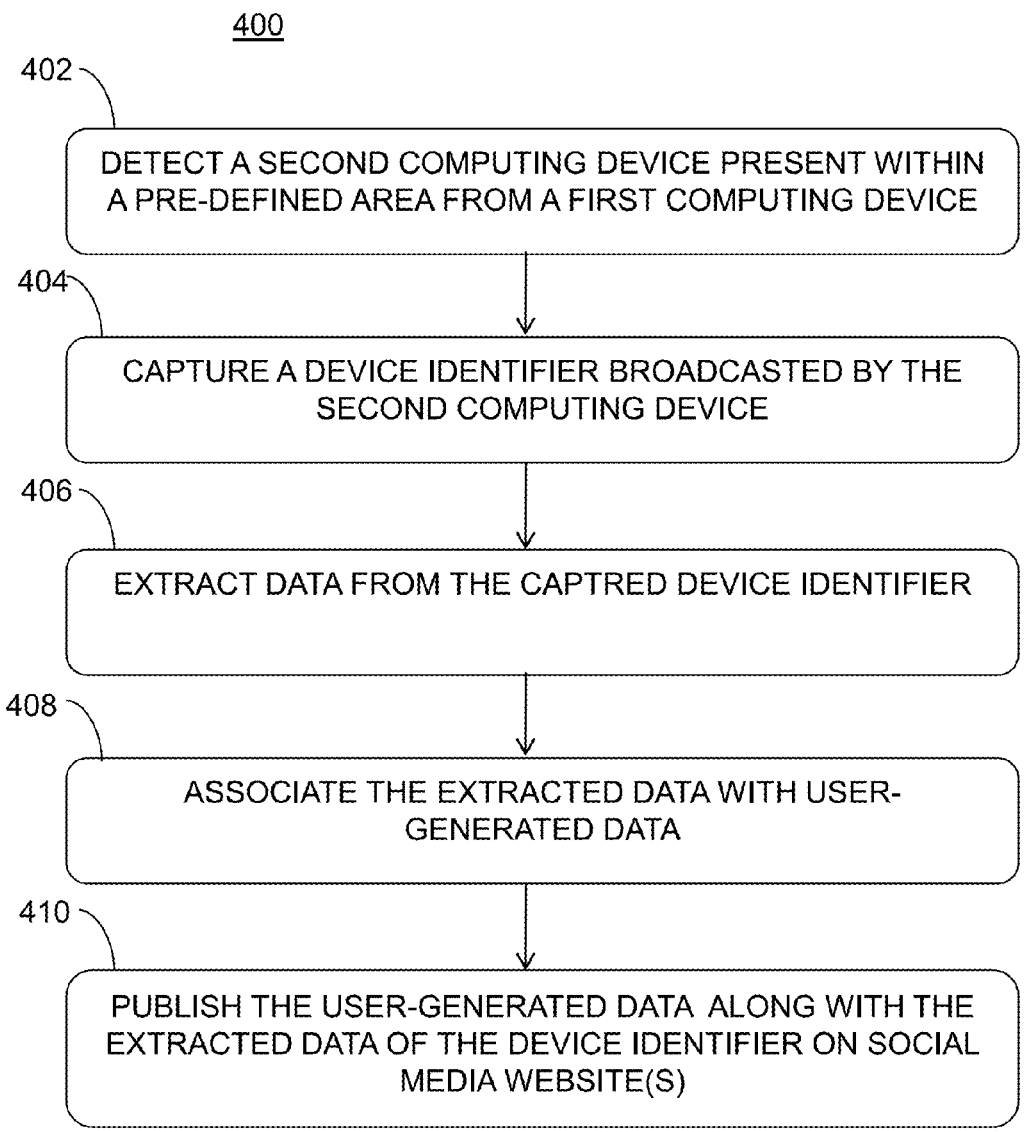
FIG. 4 is a flowchart illustrating another exemplary method for publishing data through social media websites, in accordance with another embodiment of the present disclosure.

FIG. 4 is a flowchart illustrating an exemplary method 400 for publishing content through at least one social media website, in accordance with an embodiment of the present disclosure. At step 402, at least one second computing device of the second computing devices 110A-110N is detected by the first computing device 104. In some embodiments, the detection device 202 detects the second computing devices 110A-110N present within a pre-defined area from the first computing device 104. Then at step 404, the first computing device 104 captures at least one device identifier such as SSID, UUID, that is broadcasted by the detected second computing device of the second computing device 110A-110N. At step 406, data is extracted from the captured device identifier. The captured data may be unique identifier including text, numbers, symbols, etc. The data may be extracted by the identifier processing device 204.

At step 408, the extracted data is associated with the user-generated data. The tagging device 206 may associate the extracted data with the user-generated data. At step 410, the user-generated data and the extracted data are published through the social media websites 106A-106N. In some embodiments, the data publishing device may publish the user-generated data and the extracted data along with other tags or information related to location and time of the first computing device 104 through the social media websites 106A-106N.

Figure 5:
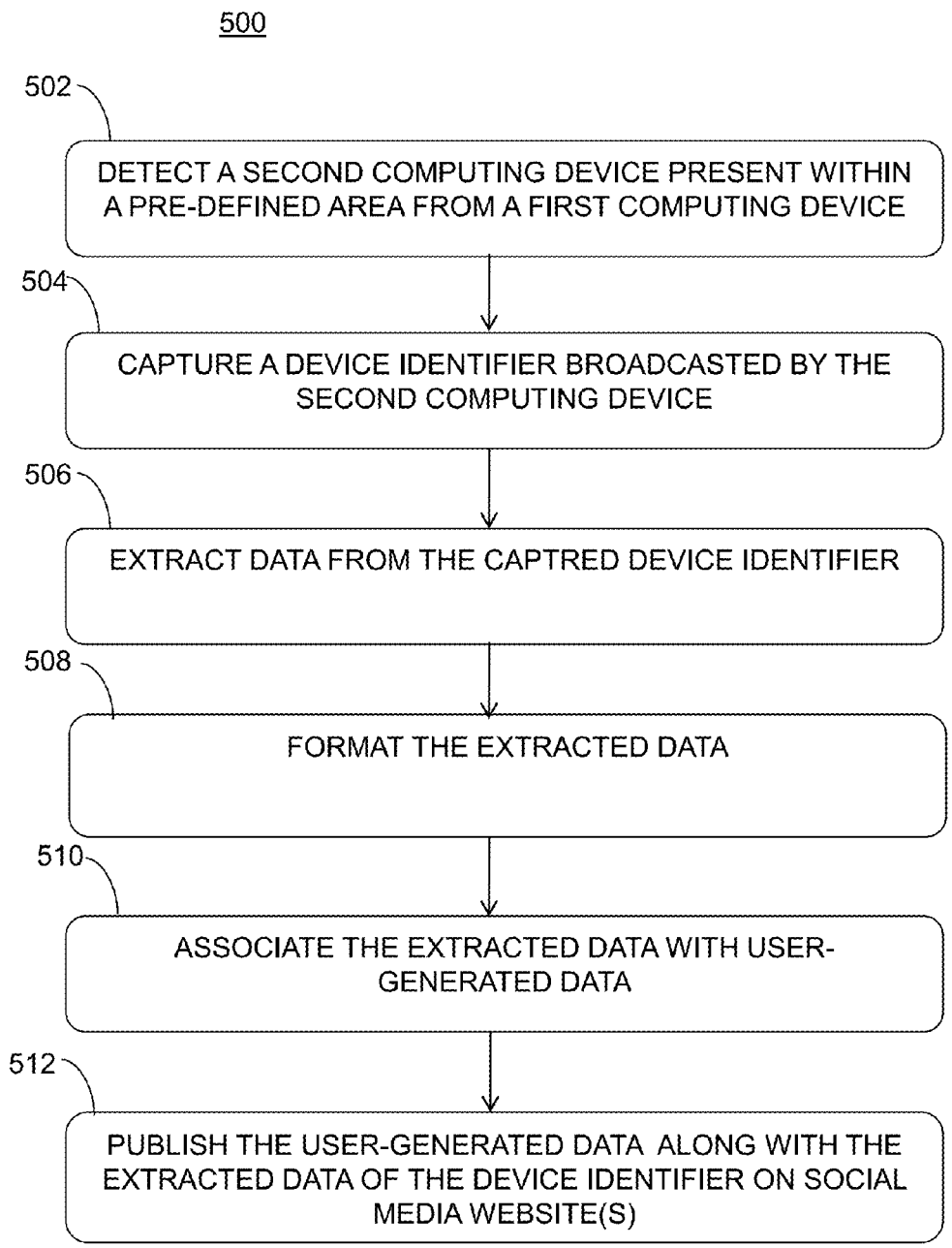
FIG. 5 is a flowchart illustrating another exemplary method for publishing data through social media websites, in accordance with another embodiment of the present disclosure.

FIG. 5 is a flowchart illustrating an exemplary method 500 for publishing content through at least one social media website, in accordance with an embodiment of the present disclosure. At step 502, at least one second computing device of the second computing devices 110A-110N is detected at the first computing device 104. In some embodiments, the detection device 202 detects the second computing devices 110A-110N present within a pre-defined area, for example 5 square meter, from the first computing device 104. Then at step 504, the first computing device 104 captures at least one device identifier such as SSID, UUID, that is broadcasted by the detected second computing device of the second computing device 110A-110N. At step 506, data is extracted from the captured device identifier. The captured data may be unique identifier including text, numbers, symbols, etc. The data may be extracted by the identifier processing device 204.

At step 508, the extracted data is formatted. In some embodiments, the tagging device 206 formats the extracted data. At step 510, the extracted data is associated with the user-generated data. The tagging device 206 may associate the extracted data with the user-generated data. At step 512, the user-generated data and the extracted data are published through the social media websites 106A-106N. In some embodiments, the data publishing device 208 may publish the user-generated data and the extracted data along with other tags or information related to location and time of the first computing device 104 through the social media websites 106A-106N.

FIG. 6 is a schematic diagram of an exemplary computing device 600 transmitting device identifier, such as multiple SSIDs (or a wireless access device), in accordance with an embodiment of the present disclosure. The computing device 600 is a Wi-Fi router in this example configured to multiple device identifiers such as, a number SSIDs 610. These multiple SSIDs 610 being broadcasted may be modified by inclusion of a unique string. The unique string included may either be an unformatted text 612 in the form of a phrase or a sentence or it may be formatted text in the form of an identifier or a hashtag 614, at a sign 616, an email id 618 or an alphanumeric. These various forms of unique strings ensure that the method may be used for large number of desirable activities such as promoting the brand of the place that owns the wireless access device or computing device 600, popularizing tag lines etc. The computing device 600 can capture these multiple identifiers, for example SSIDs 610, when the wireless access device or the computing device 600 is broadcasting them.

Figure 7:
FIG. 7 illustrates an embodiment wherein a user is provided with an option of attaching unique strings to content being posted on a social media website.

FIG. 7 is an illustrative embodiment of the manner in which the user is provided an option of attaching unique strings to content being posted on social media platforms. In the example provided a user visits a restaurant called "Good Eats" in Taiwan and wants to post a photograph 710 of the food on Facebook. When the user is posting the photograph 710 on Facebook, the user is provided with a probable list of hashtags 712 to be used along with the photograph. This list of hashtags 712 is broadcasted as unique strings by the wireless access device present in the restaurant and since the user's device is within the vicinity of the wireless access device, the user device is able to capture the unique strings (suggested hashtags 712 in this case). The user may choose any of the hashtags 712 that the user may like and post the content on Facebook. In an alternate embodiment, instead of the hashtags 712, phrases, taglines or email ids may be recommended to the user for inclusion along with the photograph.

A system used for the purpose of posting social media content in accordance with the method provided herein may include a wireless access device or a computing device that may be configured to store an identifier with a unique string. This identifier containing the unique string is transmitted/broadcasted with the help of a wireless transmitter coupled with the wireless access device. Once a receiver, which may be a computing device used by a user, is brought within the vicinity of the wireless access device, the receiver may capture the unique sting being broadcasted with the identifier. In one embodiment, the processing unit of the system may then be used to attach the unique string to user-generated content. The computing unit of the system may be configured to automatically post the content on social media platforms. In an alternate embodiment the system may be configured to include geo tag and timestamp to the user content being posted on social media.

Figure 8:
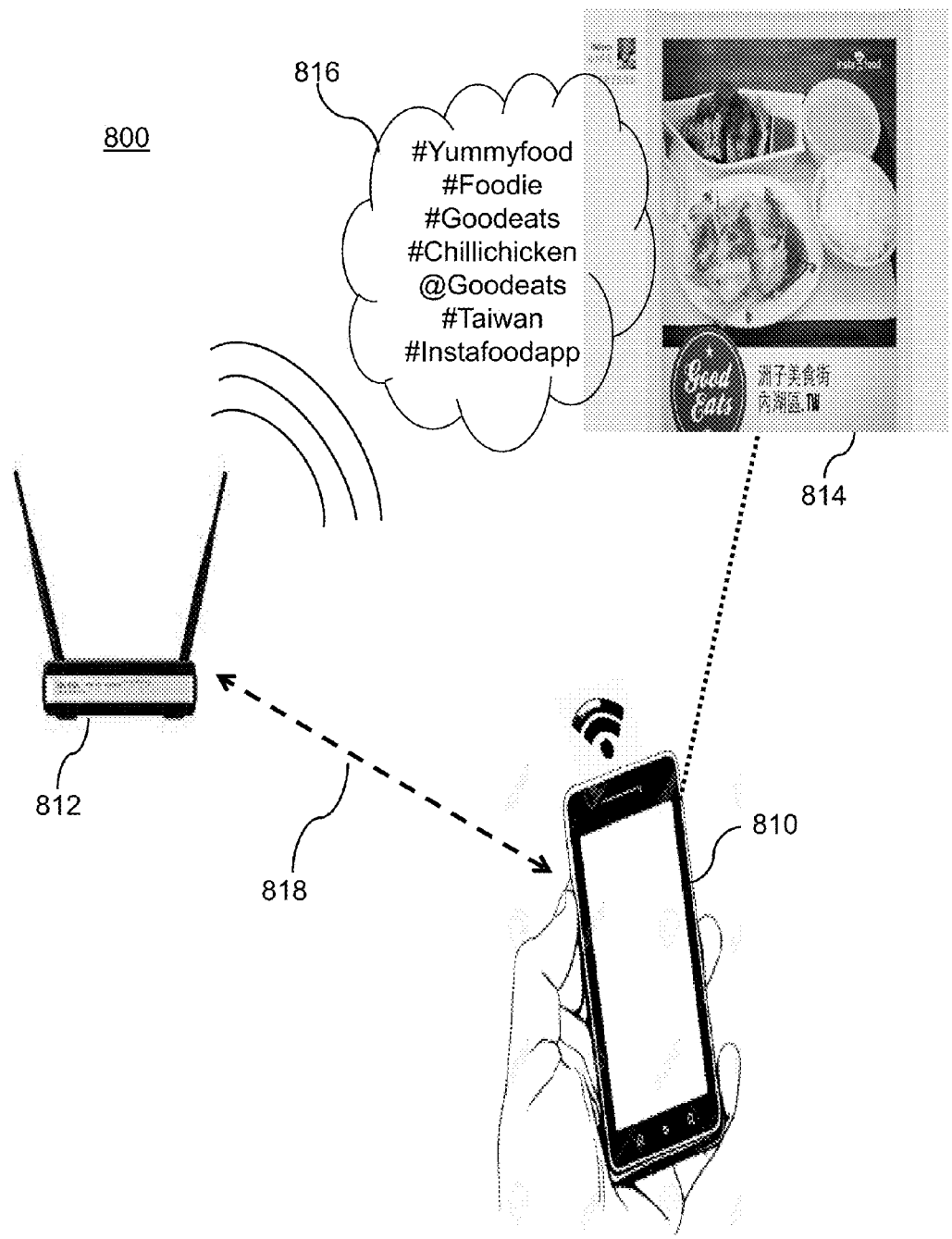
FIG. 8 is a schematic diagram illustrating an exemplary network architecture, in accordance with an embodiment of the present disclosure.

FIG. 8 is a schematic diagram illustrating a network architecture 800, in accordance with the method and system provided herein. When a user device 810 with wireless capabilities is brought within the vicinity 818 of a wireless access device 812 (or computing device 600), the user device 810 captures various unique strings 816 being broadcasted as part of wireless device identifiers by the wireless access device 812. The user device 810 is then used to post user content 814 on social media platforms wherein the user is provided an option to attach one or more of the unique strings 816 being broadcasted to the user content 814. The unique strings may comprise of hashtags, URLs, email addresses, simple phrases or network handles.

A computer program product including program instructions tangibly stored on a computer-readable medium and operable to cause a computer system to perform the method disclosed herein may be an application software that enables a computing device to capture unique strings included within identifiers being broadcasted by a wireless access device. The unique identifier may be an SSID. The application program may further provide an interface that permits the user to choose and attach specific unique strings to the content being posted on social media. In an alternate embodiment the application software may be configured to automatically post content on pre designated social media platforms along with the chosen unique strings attached to such content.

It will be understood that the devices and the databases referred to in the previous sections are not necessarily utilized together method or system of the embodiments. Rather, these devices are merely exemplary of the various devices that may be implemented within a computing device or the server device, and can be implemented in exemplary another devices, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A system for publishing data on at least one social media website, the system comprising:
   an identifier processing device configured to:
   determine a device identifier (ID) of a computing device publishing the at least one social media website, wherein the device identifier uniquely identifies the computing device in a network; and
   extract data from the determined device identifier of the computing device;
   a tagging device configured to associate the extracted data with a user-generated data; and
   a data publishing device configured to publish the extracted data along with the user-generated data through the at least one social media website on the computing device.

2. The system of claim 1, wherein the network is a wireless network.

3. The system of claim 1, wherein the device identifier comprises at least one of a Service Set Identifier (SSID) and a Universal Unique Identifier (UUID).

4. The system of claim 1, wherein the tagging device is also configured to associate the extracted data with the user-generated data by prefixing at least one handler to the extracted data.

5. The system of claim 1, wherein the data publishing device is also configured to publish the extracted data along with the user-generated data on the one or more social media websites being accessed on one or more computing devices within the network.

6. The system of claim 1, wherein the identifier processing device is further configured to format the extracted data by using the special notations.

7. The system of claim 1 further comprising information stamping device configured to:
   attaching location information to the user-generated data based on a geographical location of the computing device; and
   attaching time information to the user-generated data and the device identifier while publishing through the at least one social media website based on a time setting of the computing device.

8. A method of publishing data on at least one social media website, the method comprising:
   determining, by an identifier processing device, a device identifier (ID) of a computing device publishing the at least one social media website, wherein the device identifier uniquely identifies the computing device in a network;
   extracting, by the identifier processing device, data from the determined device identifier of the computing device;
   associating, by a tagging device, the extracted data with a user-generated data; and
   publishing, by a data publishing device, the extracted data along with the user-generated data through the at least one social media website.

9. The method of claim 8, wherein the device identifier comprises at least one of a Service Set Identifier (SSID) and a Universal Unique Identifier (UUID).

10. The method of claim 8 further comprising associating, by the tagging device, the extracted data with the at least one social media website by prefixing at least one handler to the extracted data.

11. The method of claim 8 further comprising publishing, by the data publishing device, the extracted data along with the user-generated data on the one or more social media websites being accessed on one or more computing devices within the network.

12. The method of claim 8 further comprising formatting, by the identifier processing device, the extracted data by using the special notations.

13. The method of claim 8 further comprising:
attaching, by an information stamping device, location information to the user-generated data based on a geographical location of the computing device; and
attaching, by an information stamping device, time information to the user-generated data and the device identifier while publishing on the at least one social media website based on a time setting of the computing device.

14. A method for posting data on at least one social media website using a first computing device, the method comprising:
detecting, by a detection device, a second computing device present within a pre-defined area from the first computing device;
capturing, by an identifier processing device, a device identifier of the second computing device during broadcast of the device identifier by the second computing device, wherein the device identifier uniquely identifies the second computing device in a network;
associating, by a tagging device, the captured device identifier with a user-generated data; and
posting, by a data publishing device, the user-generated data along with the device identifier through the at least one social media website.

15. The method of claim 14, further comprising, providing, by a display managing device, an option to a user for using the device identifier as a tag while posting the user-generated data along with the device identifier on the at least one social media website.

16. The method of claim 14, further comprising attaching location information to the user-generated data and the device identifier based on a geographical location of the first computing device while posting the user-generated data and the device identifier on the at least one social media website.

17. The method of claim 14, further comprising attaching time information to the user-generated data and the device identifier while posting on the at least one social media website based on a time setting of the first computing device.

18. A system for posting data on at least one social media website using a first computing device, the system comprising:
a detection device configured to detect a second computing device present within a pre-defined area from the first computing device;
an identifier processing device configured to capture a device identifier of the second computing device during broadcast of the device identifier by the second computing device, wherein the device identifier uniquely identifies the second computing device in a network;
a tagging device configured to associate the captured device identifier with a user-generated data; and
a data publishing device configured to post the user-generated data along with the device identifier through the at least one social media website.

19. The system of claim 18 further comprising a display managing device configured to provide an option to a user on the first computing device for using the device identifier as a tag while posting the user-generated data along with the device identifier on the at least one social media website.

20. The system of claim 18 further comprising an information stamping device configured to:
attach location information to the user-generated data and the device identifier while posting the user-generated data and the device identifier on the at least one social media website based on a geographical location of the first computing device; and
attach time information to the user-generated data and the device identifier while publishing on the at least one social media website based on a time setting of the computing device.

* * * * *